July 14, 1953  J. C. BARTCH ET AL  2,645,535
BEARING AND MEANS FOR LUBRICATING SAME Filed March 18, 1950  3 Sheets-Sheet 1

INVENTOR.
JAMES C. BARTCH
BY GEORGE W. COUCH

ATTORNEY

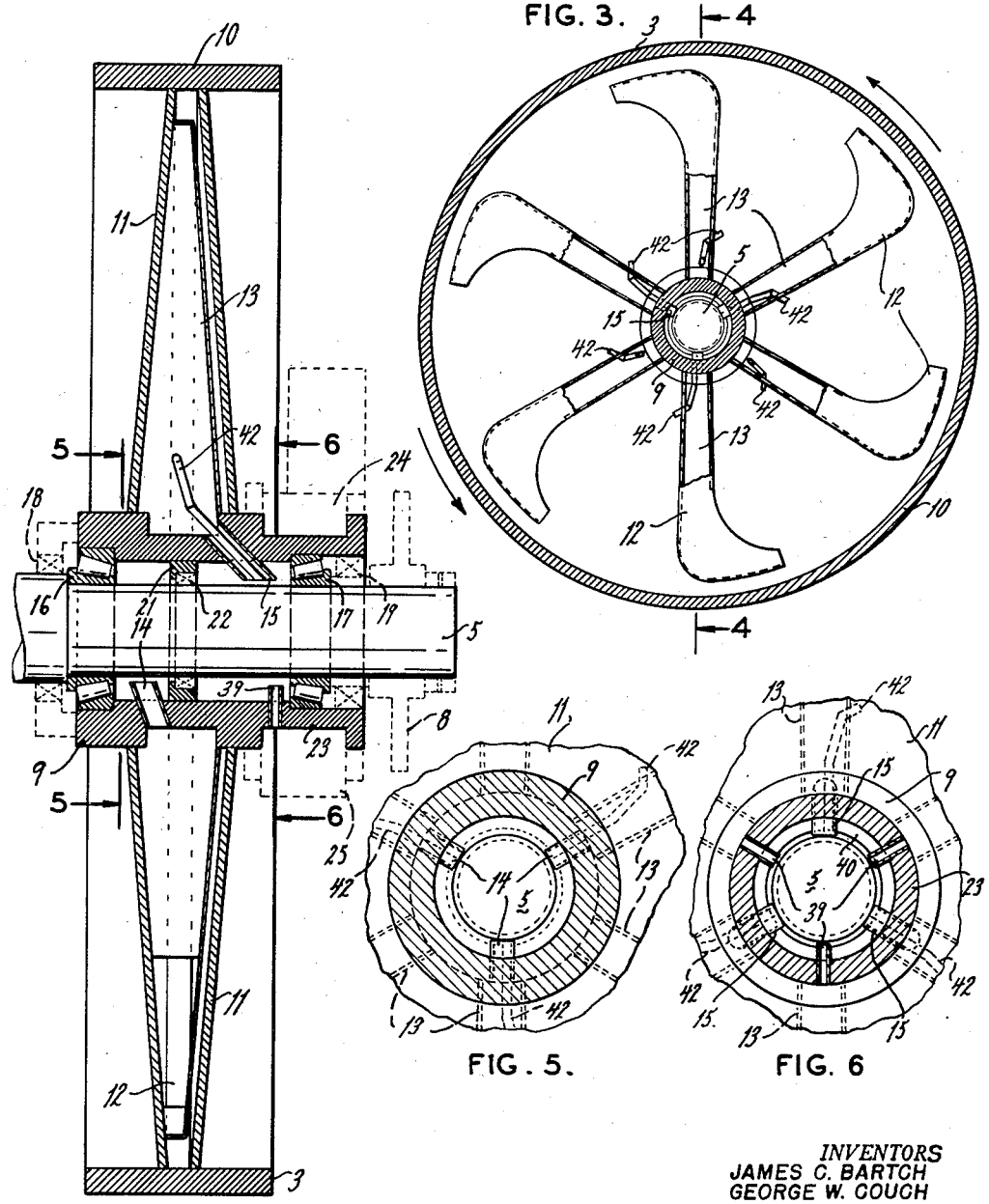

July 14, 1953  J. C. BARTCH ET AL  2,645,535
BEARING AND MEANS FOR LUBRICATING SAME
Filed March 18, 1950  3 Sheets-Sheet 3

INVENTORS
JAMES C. BARTCH
GEORGE W. COUCH
BY
ATTORNEY

Patented July 14, 1953

2,645,535

UNITED STATES PATENT OFFICE 2,645,535

BEARING AND MEANS FOR LUBRICATING SAME

James C. Bartch, Flat River, and George W. Couch, Rivermines, Mo.

Application March 18, 1950, Serial No. 150,471

14 Claims. (Cl. 308—117)

This invention pertains to bearing lubricating means which may be applied to shaft bearings or to axle bearings.

An object of this invention is to provide a mechanism whereby a slowly rotating member may actuate means for continuously supplying lubricant to the bearing.

Another object is to provide such a mechanism whereby such slowing rotating member may operate to supply lubricant to a plurality of bearings, including its own.

Another object is to provide such a mechanism including a ground wheel for a vehicle whereby the rolling of said wheel may actuate such bearing lubricating means.

Further objects will appear from the following description, taken in connection with the accompanying drawings, in which will be set forth an illustrative embodiment of this invention. It is to be understood, however, that this invention is susceptible of various embodiments, within the scope of the appended claims, without departing from the principles or spirit of the invention.

In accordance with this invention, generally stated, the bearing has associated therewith a slowly rotating member. In the illustrated embodiment this takes the form of a ground wheel for a vehicle. The structure of this member is such as to form an annular reservoir or trough adapted to contain a pool of liquid lubricant, such as oil, which remains at the bottom as the member turns. Means such as a scoop or bucket wheel is actuated by rotation of said member so as to dip into said pool and pick up lubricant therefrom, thereafter discharging the same into a channel or conduit leading to the bearing.

In the accompanying drawings,

Fig. 3 is a sectional view of the left wheel of Fig. 1, in a plane perpendicular to its axis;

Fig. 4 is an enlarged sectional view of the same wheel in a plane through the axis;

Fig. 5 is a detail section on line 5—5 of Fig. 4;

Fig. 6 is a detail section on line 6—6 of Fig. 4;

Figure 1:
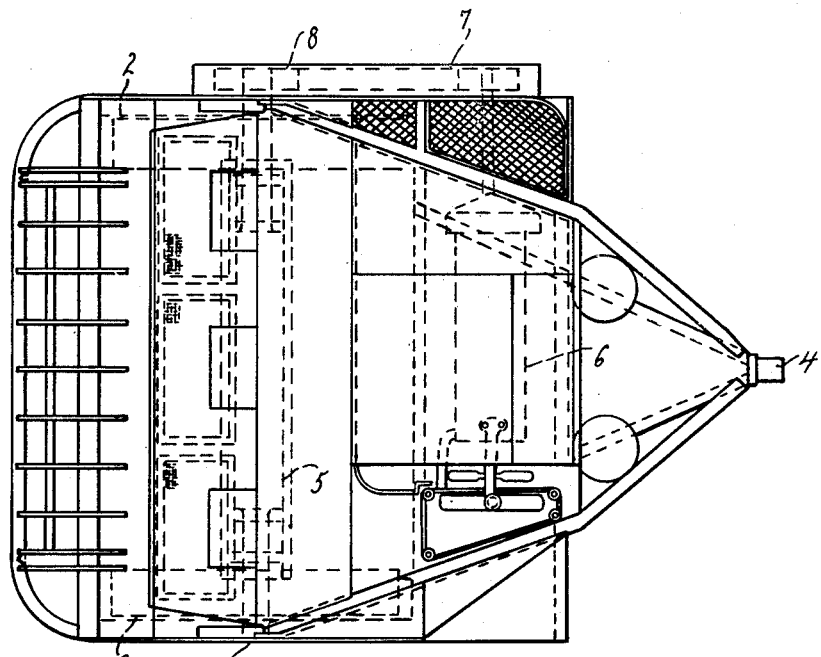
Fig. 1 is a plan view of a vehicle known as a spout destroyer having bearings and lubricating means embodying this invention.
Figure 2:
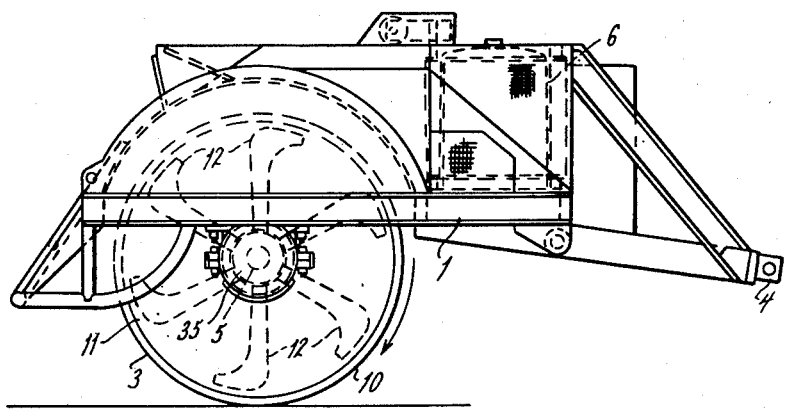
Fig. 2 is a side view of Fig. 1, with parts shown in dotted lines.
Figure 8:
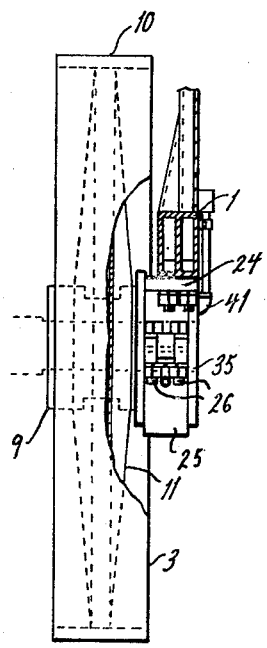
Fig. 8 is a rear view of Fig. 7 with parts in section.
Figure 7:
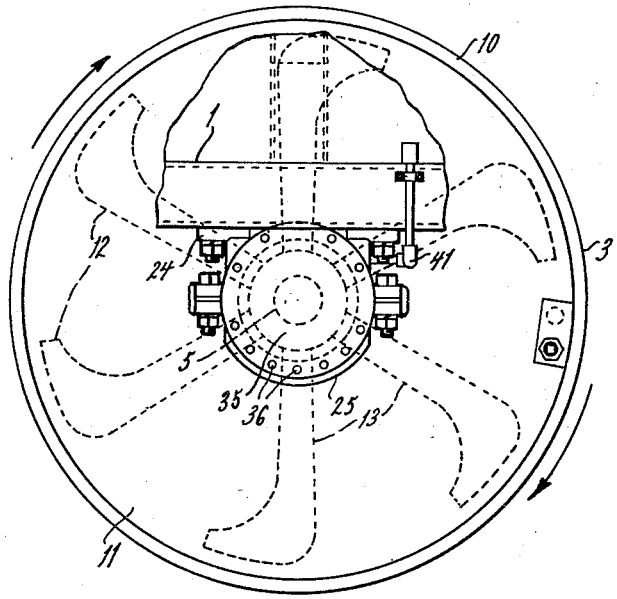
Fig. 7 is a side view of the right wheel showing its mounting on the chassis of the vehicle.

Referring to the drawings, the vehicle comprises a frame or chassis 1 supported on ground wheels 2 and 3 and is arranged to be attached to a tractor by a drawbar 4. A shaft 5 is mounted in bearings in the hubs of the wheels 2 and 3 and is driven by an engine 6 through a chain 7 engaging a sprocket 8 on said shaft. The shaft 5 has attached thereto flexible beating elements, such as chains, not shown, which operate to destroy the growth of sprouts and brush as the vehicle is hauled over the ground.

Figures 9, 10:
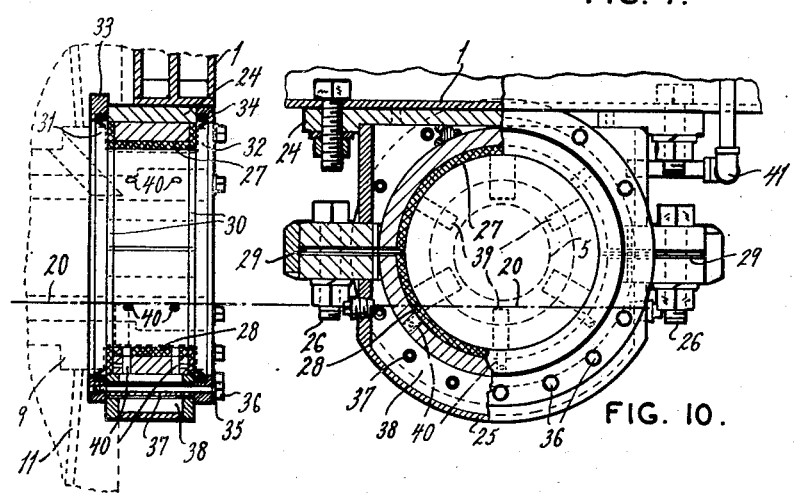
Fig. 9 is an enlarged axial section of the pillow block of Fig. 8.
Fig. 10 is an outside end view, partly in section, of the same pillow block.

The left wheel 3 is shown in detail in Figs. 3 to 6. This wheel comprises a hub 9 and a rim 10 which are connected by a pair of webs 11. These webs are secured to the rim by welding, or otherwise, so as to form between them an annular trough or reservoir adapted to contain a liquid lubricant, such as oil. Within this web structure is a series of scoops or buckets 12 positioned to dip into a pool of oil contained in the bottom of said trough as the wheel rolls along the ground. Each scoop 12 is connected to discharge into a tube or spout 13 leading to the hub 9. The hub is perforated with a series of holes in which are secured short tubes 14 and 15 leading to the interior of the hub and communicating with the spouts 13 to conduct the oil into the interior of the hub. One or more bearings of any suitable type, such as roller bearings 16 and 17 are mounted in the hub to carry the shaft 5. The ends of the hub are sealed by sealing rings 18 and 19 so that a pool of oil may be retained in the hub. The tubes 14 and 15 project radially inward a fixed distance so as to establish a constant level for the oil in this pool. This level is indicated by the line 20 in Figs. 9 and 10. Thus, the bearings 16 and 17 run in a pool of oil.

A sealing ring 21, provided with packing 22, surrounds the shaft 5 within the hub and between the ends thereof, dividing the oil pool therein into two parts. The tubes 14, connecting with three alternate spouts 13, enter one of these parts while the tubes 15, connecting with the other three spouts, enter the other part. By this arrangement the two separate pools are separately maintained by the action of the scoops 12. Thus, when the vehicle travels on uneven ground with one wheel lower than the other, the oil is prevented from running down to the lower end of the hub and the lubrication of both bearings 16 and 17 is maintained.

The hub 9 is formed with a journal portion 23 by which it may be rotatably mounted on the vehicle. This journal engages a pillow block 24 mounted on the chassis 1, and is retained by a cap section 25 secured by bolts 26 or otherwise. The pillow block and cap are lined with suitable bearing sleeve portions, the top half being shown at 27 and the lower half at 28. Shims 29 may be provided to adjust the fit of the bearing in the usual manner. End thrust bearing rings 30 may be provided at the ends of the sleeve. Seals 31 and 32 mounted in seal rings 33 and 34 respectively, seal the journal bearing against the escape of oil. The right hand pillow block may be closed by a blind flange plate 35. The members 33, 34 and 35 are secured by bolts 36 passing through tubes 37 which later are sealed into the walls of the cap 25. These tubes allow for shifting of the bolts when readjusting the cap to take up wear of the bearing.

The lower portion of the cap 25 is formed to provide an oil reservoir 38. A series of tubes 39 passing through the hub 9 establish communication between said reservoir and one of the oil pools in the hub to keep the reservoir filled to the same level 20 as that of the pools in the hub. Thus, the journal 23 also runs in a bath of oil. Passages 40 through the bearings provide access to the bearing surfaces for the oil of the bath.

A breather or vent pipe 41 is arranged to vent the interior of the pillow block and the hub 9 to the outer atmosphere. A series of small vent pipes 42, traversing the tubes 15, connect the space between the webs 11 with the interior of the hub. These prevent any locking up of air pressure which may interfere with the flow of oil.

In operation, as the vehicle travels along the ground the oil in the reservoir between the webs 11 remains in a pool at the bottom of the wheel and as the wheel rotates the scoops 12 successively dip into that pool and pick up oil therefrom. As the scoop moves to a position above the wheel axis this oil runs down the spout 13 into the hub 9 via the tubes 14 and 15. This establishes a pool within the hub on each side of the ring 21. Some of this oil, passing through the tubes 39, forms a pool within the cap 25. As parts of the bearings 16 and 17 and the journal 23 are submerged in these pools, those bearings are always assured of ample lubrication. Thus the wheel provides a slowly rotatable member wherein a stationary pool of lubricant may be retained, that is, the rotation is not fast enough to cause the oil to be thrown out to the rim by centrifugal force, and the scoops 12, mounted on the same member, provide, in effect, a bucket wheel whose buckets dip into the stationary pool successively as the wheel rotates.

It will be seen, therefore, that this invention provides lubricating means whereby the bearings of a shaft such as 5, which rotates at a relatively high speed, may be provided with ample lubrication by a simple mechanism contained in a slowing rotating member, which may be a wheel of a slowly traveling vehicle. The supply of lubricant to the bearing is continually renewed while the vehicle is traveling. However, the arrangement for running the bearing in a pool of lubricant retained in the bearing insures ample lubrication for a long time while the vehicle is standing still.

We claim:

1. In an apparatus of the character described, a ground wheel having a rim and a hub, said hub being provided with a journal portion adapted for cooperation with a bearing, a web structure connecting said rim and said hub and forming an annular reservoir adapted to contain a pool of liquid lubricant in the bottom thereof as said wheel rolls, and a conveyor mounted within said web structure operable upon rolling of said wheel to transfer lubricant from said pool to lubricate said journal portion.

2. In an apparatus of the character described, a ground wheel having a rim and a hub, said hub providing a shaft bearing and being itself provided with a journal portion adapted for cooperation with a bearing, a web structure connecting said rim and said hub and forming an annular reservoir adapted to contain a pool of liquid lubricant in the bottom thereof as said wheel rolls, and means operable upon rolling of said wheel to supply lubricant from said spool to lubricate said shaft bearing and said journal portion.

3. In an apparatus of the character described, a ground wheel having a rim and a hub, said hub providing a shaft bearing said bearing being divided normally to the axis of rotation into two separate compartments, a web structure connecting said rim and said hub and providing an annular reservoir adapted to contain a pool of liquid lubricant in the bottom thereof as said wheel rolls, and means operable upon rolling of said wheel to supply lubricant from said pool separately to the two end compartments of said bearing.

4. In an apparatus of the character described, a wheel having a rim and a hub, means on said hub providing a bearing, a web structure connecting said rim and said hub adapted to provide a reservoir for a pool of liquid lubricant in the bottom thereof as the wheel turns, means on said hub adapted to retain a pool of lubricant therein, a vent in said hub above the pool therein to the outer atmosphere, and means including a scoop rotating with said wheel adapted to pick up lubricant from said reservoir and supply the same to said pool.

5. A wheel and bearing assembly including a hub mounted in a bolster bearing, a shaft bearing within an opening centrally through the hub, a shaft journalled in said bearing with a substantial clearance space from the wall of the opening to provide an oil pool about the shaft and in communication with the shaft bearing, a lubricant chamber about the hub, a scoop in said lubricant chamber with a spout through the wall of said central opening and constructed and arranged upon rotation to deposit lubricant through the spout into said pool about the shaft, and a conduit connecting said space with said bolster bearing.

6. A wheel and bearing assembly including a hub having a central cylindrical opening therethrough, a bearing in said opening, a shaft journalled in said bearing with a substantial clearance from the wall of said opening, annular seals about the shaft at the ends of said opening to provide an oil pool about the shaft and in communication with the shaft bearing, a lubricant chamber about the hub, a scoop in said lubricant chamber with a spout through the wall of said central opening and constructed and arranged upon rotation to deposit lubricant through the spout into said spool about the shaft, and a vent tube associated with said spout.

7. A wheel and bearing assembly including a hub having a central cylindrical opening therethrough, a bearing in said opening, a shaft journalled in said bearing with a substantial clearance from the wall of said opening, annular seals about the shaft at the ends of said opening to provide an oil pool about the shaft and in communication with the shaft bearing, a lubricant chamber about the hub, and a scoop in said lubricant chamber with a spout through the wall of said central opening and constructed and arranged upon rotation to deposit lubricant through the spout into said pool about the shaft, and a vent tube associated with said spout, said spout extending radially inward from the wall of said pool to establish a liquid level therein.

8. A wheel and bearing assembly including a hub, a pair of bearings spaced from each other mounted in the hub, a shaft journalled in the bearings, means providing an oil reservoir about the shaft, a seal about the shaft dividing said reservoir into two pools one in communication with each bearing, a lubricant chamber about the hub, and a plurality of scoops in the lubricant chamber each with a spout through a wall of said pool and constructed and arranged upon rotation to deposit lubricant through the spout into said reservoir, some of the spouts opening into one pool and some into the other pool, said spouts extending radially inward from the wall of said reservoir to establish liquid levels in each of said pools.

9. A wheel and bearing assembly comprising a liquid lubricant reservoir formed within the diameter of the wheel, an axle bearing having a lubrication chamber therein, a conduit connecting said reservoir and said chamber constructed and arranged to maintain a constant lubricant level in said chamber, a lubricant scoop fixed within said reservoir communicating with said conduit and operable upon the turning of the wheel with the consequent shift of liquid lubricant in the reservoir to convey lubricant to said chamber.

10. A wheel and bearing assembly comprising a liquid lubricant reservoir formed within the diameter of the wheel, an axle bearing having a mounting journal extending therefrom, a lubricant conduit adapted and constructed to connect said reservoir with said axle bearing and said journal and a lubricant scoop fixed within said reservoir operable upon the turning of the wheel with the consequent shift of liquid lubricant to convey said lubricant through said conduit to said bearing and said journal.

11. A wheel and bearing assembly comprising a liquid lubricant reservoir formed within the diameter of the wheel, an axle bearing having a journal portion extending therefrom, a pillow-block constructed and arranged to bear on said journal portion, a lubricant conduit adapted and constructed to connect said reservoir with said axle bearing and said pillow-block bearing, and a lubricant scoop fixed within said reservoir communicating with said conduit operable upon the turning of the wheel with the consequent shift of liquid lubricant to convey said lubricant to said axle bearing and said pillow-block bearing.

12. A wheel and bearing assembly comprising a liquid lubricant reservoir formed within the diameter of the wheel, an axle bearing having a lubrication chamber therein and a journal portion thereon, a pillow-block structure providing a bearing for said journal portion and having a lubrication compartment therein communicating with said chamber, a conduit leading from said reservoir and opening into said chamber far enough to maintain a pool of lubricant therein, and a lubricant scoop fixed within said reservoir communicating with said conduit and operable upon the turning of the wheel with the consequent shift of the liquid lubricant in the reservoir to convey lubricant to said chamber and said compartment.

13. In an apparatus of the character described, a ground wheel having a rim and a hub, said hub providing a shaft bearing, a web structure connecting said rim and said hub and providing an annular reservoir adapted to contain a pool of liquid lubricant in the bottom thereof as said wheel rolls, a lubrication chamber formed within said shaft bearing divided normal to the axis of rotation into two end portions and adapted to contain separate pools of lubricant, a lubricant over-flow conduit positioned within each chamber portion effective to maintain a constant lubricant level, and a scoop fixed within said reservoir communicating with said conduits operable upon the turning of the wheel to dip lubricant from the reservoir pool and convey it through said conduits to said chamber portions.

14. In an apparatus of the character described, a ground wheel having a rim and a hub, said hub providing a shaft bearing and being itself provided with a journal structure adapted for cooperation with a bearing, a web structure connecting said rim and said hub and providing an annular reservoir adapted to contain a pool of liquid lubricant in the bottom thereof as said wheel rolls, a lubrication chamber formed within said shaft bearing divided normally to the axis of rotation into two end portions adapted to contain separate pools of lubricant and communicate with said journal, a lubricant overflow conduit positioned within each chamber portion effective to maintain a constant lubricant level, and a scoop fixed within said reservoir communicating with said conduits operating upon the turning of the wheel to dip lubricant from the reservoir pool and convey it through said conduits to said chamber portions.

JAMES C. BARTCH.
GEORGE W. COUCH.

References Cited in the file of this patent

UNITED STATES PATENTS

| Number | Name | Date |
|---|---|---|
| 1,183,983 | Johnson | May 23, 1916 |
| 1,443,990 | Harden | Feb. 6, 1923 |
| 2,567,562 | Holleron | Sept. 11, 1951 |

FOREIGN PATENTS

| Number | Country | Date |
|---|---|---|
| 268,154 | Great Britain | Mar. 31, 1927 |
| 449,430 | Great Britain | June 26, 1936 |